(12) United States Patent
Park et al.

(10) Patent No.: US 9,776,886 B2
(45) Date of Patent: Oct. 3, 2017

(54) APPARATUS FOR PREPARING CATHODE ACTIVE MATERIAL PRECURSOR FOR LITHIUM SECONDARY BATTERIES AND METHOD FOR PREPARING THE SAME USING THE APPARATUS

(71) Applicants: LG CHEM, LTD., Seoul (KR); University-Industry Cooperation Group of Kyung Hee University, Yongin-si, Gyeonggi-do (KR)

(72) Inventors: ByungChun Park, Daejeon (KR); Woosik Kim, Seoul (KR); HoSuk Shin, Seoul (KR); Soonho Ahn, Seoul (KR); Hong Kyu Park, Daejeon (KR); Joon Hyun Chang, Seoul (KR)

(73) Assignees: LG CHEM, LTD, Seoul (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 160 days.

(21) Appl. No.: 14/692,529

(22) Filed: Apr. 21, 2015

(65) Prior Publication Data
US 2015/0225255 A1     Aug. 13, 2015

Related U.S. Application Data

(62) Division of application No. 13/605,536, filed on Sep. 6, 2012, now abandoned.

(51) Int. Cl.
*H01B 1/08*     (2006.01)
*H01M 4/48*     (2010.01)
(Continued)

(52) U.S. Cl.
CPC ........ *C01G 53/006* (2013.01); *B01J 19/1843* (2013.01); *H01B 1/08* (2013.01);
(Continued)

(58) Field of Classification Search
CPC .. H01B 1/00; H01B 1/08; H01M 4/00; H01M 4/04; H01M 4/0471; H01M 4/48; H01M 4/485
See application file for complete search history.

(56) References Cited

U.S. PATENT DOCUMENTS 4,174,907 A   11/1979   Suh et al.
4,357,112 A   11/1982   Davis
(Continued)

FOREIGN PATENT DOCUMENTS

| KR | 10-2004-0007356 A | 1/2004 |
|---|---|---|
| KR | 10-2011-0099935 A | 9/2011 |
| WO | WO 94/11096 A1 | 5/1994 |

*Primary Examiner* — Mark Kopec
(74) *Attorney, Agent, or Firm* — Birch, Stewart, Kolasch & Birch, LLP

(57) ABSTRACT

Provided are an apparatus for preparing a cathode active material precursor for lithium secondary batteries including a cylindrical outer chamber, an inner cylinder that has the same central axis as the outer chamber and is mounted to rotatably move along the central axis, an electric motor to transfer power to rotate the inner cylinder, a reactant inlet disposed on the outer chamber, to add reactants to a space between the outer chamber and the inner cylinder, and an outlet disposed in the outer chamber, to obtain reaction products after reaction in the space between the outer chamber and the inner cylinder, and a method for preparing a cathode active material precursor for lithium secondary batteries using the apparatus.

7 Claims, 20 Drawing Sheets

(51) Int. Cl.
  *C01G 53/00*   (2006.01)
  *H01M 4/485*   (2010.01)
  *B01J 19/18*   (2006.01)
  *H01M 4/505*   (2010.01)
  *H01M 4/525*   (2010.01)
  *H01M 10/052*   (2010.01)

(52) U.S. Cl.
  CPC ........... *H01M 4/485* (2013.01); *H01M 4/505* (2013.01); *H01M 4/525* (2013.01); *B01J 2219/00094* (2013.01); *B01J 2219/182* (2013.01); *C01P 2004/03* (2013.01); *C01P 2004/52* (2013.01); *H01M 10/052* (2013.01)

(56) References Cited

U.S. PATENT DOCUMENTS

| | | | |
|---|---|---|---|
| 6,471,392 B1* | 10/2002 | Holl | ........................ B01F 7/12 366/279 |
| 2007/0111098 A1 | 5/2007 | Yang Kook et al. | |
| 2009/0023816 A1 | 1/2009 | Lefevre et al. | |
| 2009/0309062 A1* | 12/2009 | Kawakami | ............. C01D 15/02 252/182.1 |

* cited by examiner

APPARATUS FOR PREPARING CATHODE ACTIVE MATERIAL PRECURSOR FOR LITHIUM SECONDARY BATTERIES AND METHOD FOR PREPARING THE SAME USING THE APPARATUS

This application is a divisional of application Ser. No. 13/605,536 filed on Sep. 6, 2012, now abandoned, all of which is hereby expressly incorporated by reference into the present application.

FIELD OF THE INVENTION

The present invention relates to an apparatus and a method for preparing a cathode active material precursor for lithium secondary batteries. More specifically, the present invention relates to an apparatus for preparing a cathode active material precursor for lithium secondary batteries, comprising: a cylindrical outer chamber; an inner cylinder that has the same central axis as the outer chamber and is mounted to rotatably move along the central axis; an electric motor to transfer power to rotate the inner cylinder; a reactant inlet disposed on the outer chamber to add reactants to a space between the outer chamber and the inner cylinder; and an outlet disposed in the outer chamber to obtain reaction products after reaction in a space between the outer chamber and the inner cylinder, and a method for preparing a cathode active material precursor for lithium secondary batteries using the apparatus.

BACKGROUND OF THE INVENTION

Rapid development of electronic, communication and computer industries has brought about remarkable development of camcorders, cellular phones, notebook computers and the like. Accordingly, demand for lithium secondary batteries as power sources capable of driving portable telecommunication equipment is gradually increasing. In particular, research and development associated with applications such as electric vehicles, eco-friendly power sources, uninterrupted power supplies, electrically-drive tools and artificial satellites is underway in Korea as well as Japan, Europe, the U.S. and the like.

Cathode active materials for lithium secondary batteries generally use lithium cobalt oxide ($LiCoO_2$), but lithium nickel oxide ($Li(Ni-Co-Al)O_2$), lithium composite metal oxide ($Li(Ni-Co-Mn)O_2$) and the like are used as other layered cathode active materials. Further, spinel lithium manganese oxide ($LiMn_2O_4$) and olivine iron phosphate lithium ($LiFePO_4$) having a low cost and superior stability also attract much attention.

Regarding a method for synthesizing these substances, industrial lithium cobalt oxide ($LiCoO_2$) is synthesized using a solid synthesis method in which raw materials are mostly synthesized by solid reaction at 800 to 1,000° C. C. The reason is that a solid method generally uses cheap raw materials such as oxides, hydroxides or carbonates of metals is suitable for mass-production and exhibits substantially superior cycle properties.

In general, a solid method comprises mixing lithium and cobalt as raw materials to prepare a pellet of a mixture, thermally treating the pellet in the air at 800 to 1,000° C. for 20 to 24 hours, and grinding the pellet. Also, the ground oxide is prepared into a pellet again and is then repeatedly subjected to thermal treatment and grinding processes.

However, as can be seen from the synthesis method, since this method requires solid reaction of raw materials, a synthesis temperature should be high. Diffusion distance between raw materials is large, thus causing an increase in thermal treatment time. Furthermore, thermal treatment and grinding processes should be performed several times in order to control homogeneity during synthesis.

In order to solve these problems of solid method, a variety of synthesis methods such as low-temperature synthesis, liquid reaction of raw materials or a method for synthesizing lithium metal oxide including preparing a homogeneous precursor from a liquid and thermally treating the precursor are researched.

Researched representative solid methods include a sol-gel method, a co-precipitation method, hydrothermal synthesis, ion exchange reaction under hydrothermal conditions, mechanical alloying, ultrasonic spray pyrolysis, reflux reaction and the like.

A variety of methods for preparing multi-component metal oxide-based cathode active material precursors were suggested. However, co-precipitation using multi-component metal salts such as nickel, cobalt, manganese and aluminum as starting materials is considered to be the most economic and practically applicable method.

However, co-precipitation has disadvantages in that it is difficult to prepare particles having a uniform size, since multi-component precursors prepared by co-precipitation contain a great amount of fine particles with a wide particle size distribution due to long retention time in a continuous stirred-tank reactor (CSTR), and the precursors contain a great amount of alkali salts as by-products produced during co-precipitation.

The inventors of the present invention researched an apparatus and a method for preparing a cathode active material precursor for lithium secondary batteries using co-precipitation for preparation of cathode active material precursors for lithium secondary batteries, capable of obtaining uniform particles and performing processes with superior reproducibility. The present inventors discovered that aggregation of crystal particles for a short reaction period of time is facilitated and cathode active material precursors for lithium secondary batteries can be prepared in the form of uniform particles by using a double cylindrical rotation crystallizer for preparing the cathode active material precursors for lithium secondary batteries according to the present invention and the method for preparing the cathode active material precursors using the apparatus. The present invention has been completed based on this discovery.

SUMMARY OF THE INVENTION

It is one object of the present invention to provide an apparatus and a method for preparing a cathode active material precursor for lithium secondary batteries, in which reaction time is shortened and aggregation of crystal particles is facilitated in the preparation of a cathode active material precursor for lithium secondary batteries, to obtain particles with a uniform size and thereby enable mass-production and impart superior properties to the cathode active material precursor for lithium secondary batteries.

In accordance with one aspect of the present invention, provided is an apparatus for preparing a cathode active material precursor for lithium secondary batteries, including: a cylindrical outer chamber; an inner cylinder that has the same central axis as the outer chamber and is mounted to rotatably move along the central axis; an electric motor to transfer power to rotate the inner cylinder; a reactant inlet disposed on the outer chamber, to add reactants to a space between the outer chamber and the inner cylinder; and an outlet disposed in the outer chamber, to obtain (pull out) reaction products after reaction in a space between the outer chamber and the inner cylinder.

In one embodiment of the present invention, the cylindrical outer chamber may be fixed. In this case, the outer chamber and the inner cylinder may be spaced from each other along the central axis by a predetermined distance.

The distance between the outer chamber and the inner cylinder corresponds to a length in the central axial direction of each vortex cell in the form of ring pairs that rotates in opposite directions along the central axial direction due to rotational motion of the inner cylinder. Also, in a specific embodiment of the present invention, the central axis may be disposed in a horizontal direction with respect to the ground.

In one embodiment of the present invention, a length of the cylindrical outer chamber may be 10 to 1,000 cm, a distance (d) between a radius (r1) of the outer chamber and a radius (r2) of the inner cylinder is 0.1 to 100 cm, and the inner cylinder may be rotated at 10 to 5,000 rpm.

In one embodiment of the present invention, one or more reactant inlets may be mounted on the front end of the outer chamber, to inject the reactants required for preparation of the cathode active material precursor for lithium secondary batteries.

In one embodiment of the present invention, a plurality of outlets may be formed along the central axial direction. Specifically, the plurality of outlets may be mounted on the outer chamber in parallel to the reactant inlet in an axial direction and may be spaced from the reactant inlet by a predetermined distance.

In one embodiment of the present invention, the reactant inlet is formed on the side end of the outer chamber, and the reactant inlet and the outlets may be formed on the outer chamber by a predetermined distance.

In one embodiment of the present invention, the inner cylinder includes protrusions on the outer surface to facilitate mixing of reactants.

In accordance with another aspect of the present invention, provided is a method for preparing a cathode active material precursor for lithium secondary batteries using the apparatus for preparing a cathode active material precursor for lithium secondary batteries.

The method according to the present invention comprises: adding reactants containing a metal salt aqueous solution, a basic aqueous solution and an aqueous ammonia solution to a reactant inlet (step 1); rotating the inner cylinder to form ring-shaped vortex pairs that rotate in opposite directions along the central axial direction and to mix the reactants in the space between the outer chamber and the inner cylinder after addition of the reactants in step 1 (step 2); obtaining a reaction product-containing solution of the reactants mixed, while the reactants moving in the axial direction of the outer chamber in step 2 from the outlet (step 3); and drying the reaction product-containing solution obtained in step 3 and oxidizing the same in the air (step 4).

Step 2 may further comprise continuously adding the reactants through the reactant inlet during mixing in the space between the outer chamber and the inner cylinder.

In one embodiment of the present invention, in step 1, the metal salt aqueous solution is a metal salt aqueous solution in which a metal salt containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo) is dissolved at a concentration of 0.5M to 4M in water, and the metal salt may be a metal salt, such as sulfate, nitrate, acetate, chlorate or phosphate, containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo).

In one embodiment of the present invention, in step 2, the inner cylinder was rotated at a speed of 10 to 5,000 rpm and the reactants are mixed at a temperature of 30 to 60° C. and at a pH 10 to 12.

In one embodiment of the present invention, the reaction product-containing solution of the reactants obtained through the outlet in step 3 is obtained by mixing for an average retention time of 10 seconds to 5 hours.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, the present invention will be described in detail.

The present invention relates to an apparatus for preparing a mono-component or multi-component metal oxide-based cathode active material precursor, comprising: a cylindrical outer chamber; an inner cylinder that has the same central axis as the outer chamber and is mounted to rotatably move along the central axis; an electric motor to transfer power to rotate the inner cylinder; a reactant inlet disposed on the outer chamber, to add reactants to a space between the outer chamber and the inner cylinder; and an outlet disposed in the outer chamber, to obtain reaction products after reaction in a space between the outer chamber and the inner cylinder.

The cathode active material precursor for lithium secondary batteries prepared using the apparatus for preparing the cathode active material precursor for lithium secondary batteries according to the present invention may be in the form of uniform particles and can be obtained at a high yield within a short time as compared to a case of using a conventional preparation apparatus, thus realizing mass-production of cathode active material precursors for lithium secondary batteries with superior properties.

The apparatus for preparing a cathode active material precursor for lithium secondary batteries will be described with reference to the annexed drawings in detail.

Figure 1:
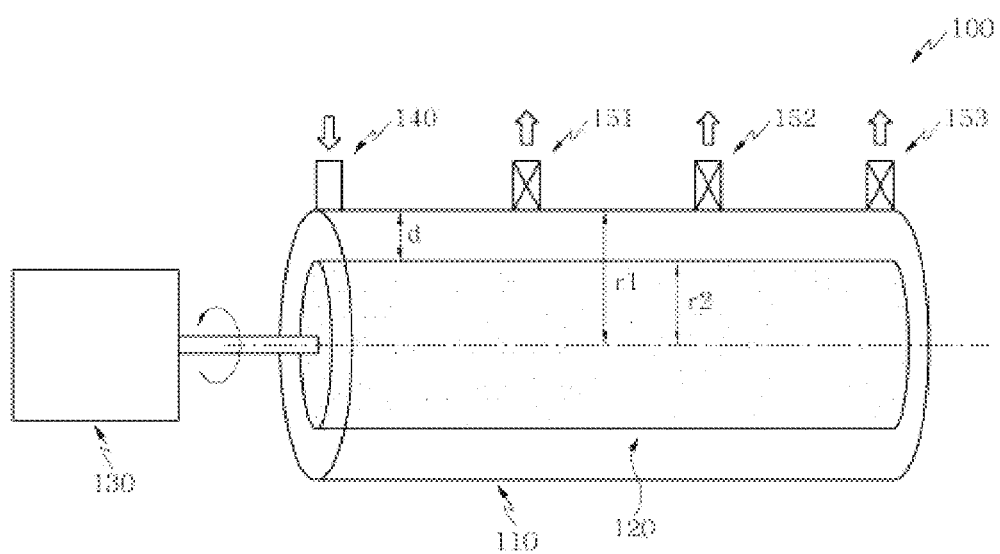
FIG. 1 is a side sectional view illustrating an apparatus for preparing a cathode active material precursor for lithium secondary batteries according to one embodiment of the present invention.

FIG. 1 is a side sectional view illustrating an apparatus for preparing a cathode active material precursor for lithium secondary batteries 100 according to one embodiment of the present invention.

Referring to FIG. 1, a rotatable inner cylinder 120 is mounted in a fixed cylindrical outer chamber 110. The inner cylinder 120 has a smaller diameter than the diameter of the outer chamber 110 to form a space between the outer chamber 110 and the inner cylinder 120 and a metal salt aqueous solution, a basic aqueous solution and an ammonia aqueous solution react in the space when the inner cylinder rotates, to prepare a mono-component metal oxide-based or multi-component metal oxide-based cathode active material precursor, for example, Co(OH)$_2$, Ni(OH)$_2$, Mn(OH)$_2$, MnNiCo(OH)$_2$ or the like.

Preferably, materials for the cylindrical outer chamber 110 and the inner cylinder 120 may be selected from acryl, stainless steel and the like, and the cylindrical outer chamber 110 and the inner cylinder 120 are mounted in a horizontal direction in order to reduce effects on variation in pressure when a fluid between the outer chamber 110 and the inner cylinder 120 flows.

In one embodiment of the present invention, a difference (d) between a radius (r1) of the cylindrical outer chamber 110 and a radius (r2) of the inner cylinder 120 is preferably 0.1 to 100 cm and is not limited thereto.

The inner cylinder 120 may rotate in the space between the outer chamber 110 and the inner cylinder 120 to enable reaction of the metal salt aqueous solution, the basic aqueous solution and the ammonia aqueous solution, and the rotation speed is preferably 10 to 5,000 rpm and is not limited thereto.

The power to rotate the inner cylinder 120 may be applied from a direct electric motor 130 connected to the inner cylinder 120 and a rotation speed may be controlled using a direct current voltage controller. During rotation of the inner cylinder 120, outside the rotational axis may be sealed with a sealing means such as O-ring in order to block air injected into the gap between the rotational axis and the bearing.

Figure 2:
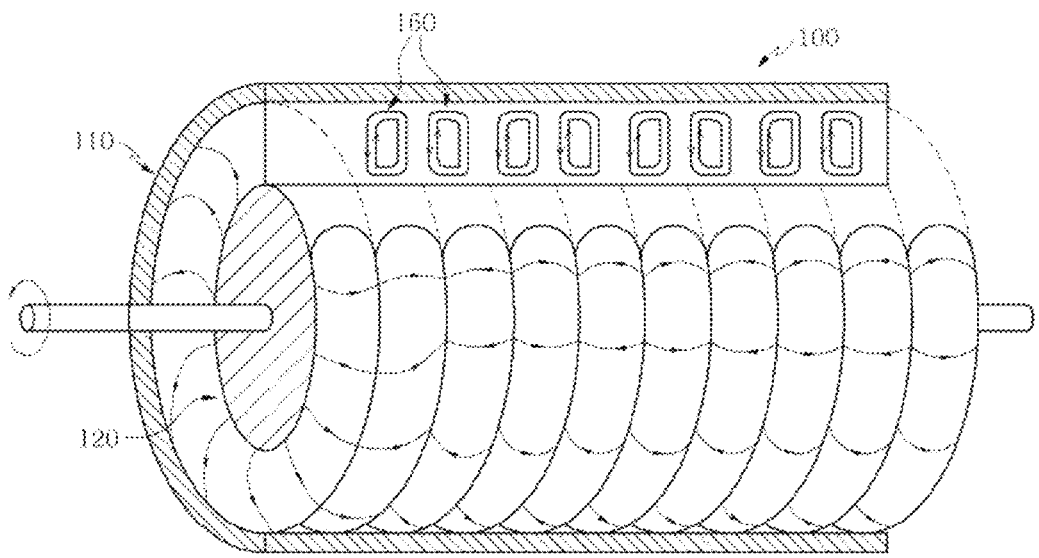
FIG. 2 is a view illustrating, by an arrow, a flow state, such as vortex, of fluids generated while fluids flow in the space between the outer chamber and the inner cylinder in an apparatus for preparing a cathode active material precursor for lithium secondary batteries according to the present invention.

FIG. 2 is a view illustrating, by an arrow, a flow state, such as vortex, of fluids generated while the fluids flow in the space between the outer chamber 110 and the inner cylinder 120 in an apparatus for preparing a cathode active material precursor for lithium secondary batteries 100 according to the present invention.

Referring to FIG. 2, when a reactants-mixed solution such as an aqueous metal salt solution, a basic aqueous solution and an aqueous ammonia solution flows between the outer chamber 110 and the inner cylinder 120, the inner cylinder 120 rotates, thereby forming vortex cells in an axial direction. The vortex cells make mixing in a radial direction more dominant than mixing in the axial direction in the apparatus for preparing a cathode active material precursor for lithium secondary batteries 100 of the present invention.

When flow in the axial direction is present, mixing between vortex cells occurs, but fluids close to the inner cylinder 120 tend to flow in the fixed direction of the outer chamber 110 due to centrifugal force. Unstable fluids form a pair of ring-shaped vortexes that rotate in opposite directions along the axial direction.

Such a vortex region is formed when the rotational speed of the inner cylinder 120 is a critical value or more. When the inner cylinder 120 rotates at 100 rpm or more in one embodiment of the present invention, vortexes of fluids between the outer chamber 110 and the inner cylinder 120 may be formed.

The vortexes of fluids between the outer chamber 110 and the inner cylinder 120 shown in FIG. 2 are composed of ring-shaped vortex pairs that rotate in opposite directions, and the length of cells in the axial direction is substantially equivalent to or same as the distance between the inner cylinder 120 and the outer chamber 110.

As such, in the apparatus for preparing a cathode active material precursor for lithium secondary batteries 100 of the present invention, as the inner cylinder 120 rotates, the vortex pairs are formed, flow is highly regular and uniform mixing is obtained. As a result, uniform mixing conditions can be obtained.

Accordingly, using the apparatus 100 for preparing a cathode active material precursor for lithium secondary batteries of the present invention, it is possible to prepare a cathode active material precursor for lithium secondary batteries between the outer chamber 110 and the inner cylinder 120 with a uniform particle size by reacting a mixed solution such as a metal salt aqueous solution, a basic aqueous solution, or an aqueous ammonia solution.

The apparatus 100 for preparing a cathode active material precursor for lithium secondary batteries of the present invention is provided at the front end of the cylindrical outer chamber 110 with a reactant inlet 140 through which reactants, such as aqueous metal salt solution, basic aqueous solution, or aqueous ammonia solution, are injected. One or more reactant inlets 140 may be provided at the front end of the outer chamber 110, if those skilled in the art desire.

Figure 3:
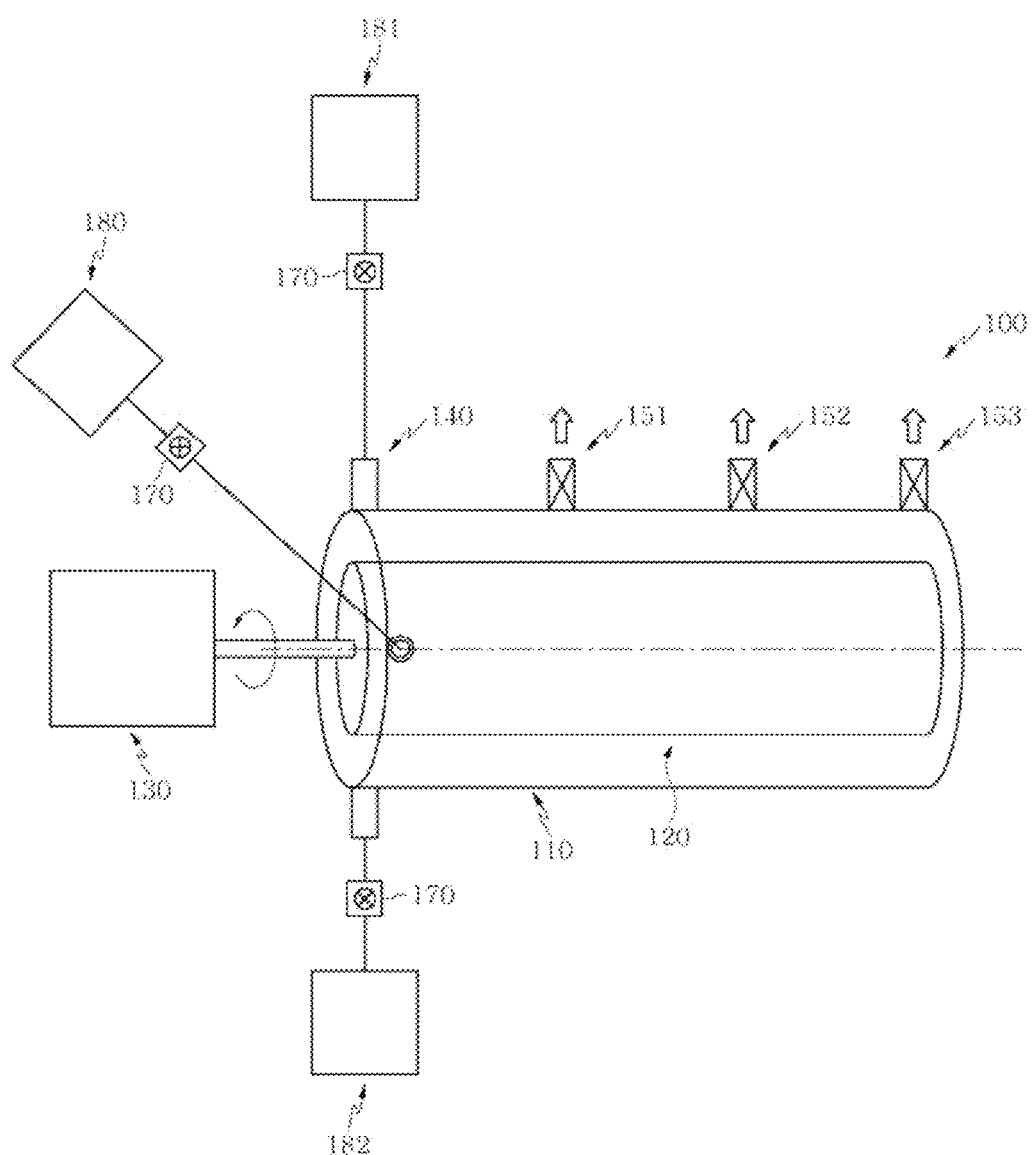
FIG. 3 is a schematic view illustrating an apparatus for preparing a cathode active material precursor for lithium secondary batteries according to one embodiment of the present invention having a configuration in which a reactant flow control pump and aqueous solution storage tanks are connected to a reactant inlet.

As shown in FIG. 3, the apparatus 100 for preparing a cathode active material precursor for lithium secondary batteries of the present invention may further include a reactant flow control pump 170 to control flow of reactants connected to the reactant inlet 140.

The reactant flow control pump 170 is disposed between storage tanks 180, 181 and 182 to store an aqueous metal salt solution, a basic aqueous solution and an aqueous ammonia solution, and the reactant inlets 140, to control flow of the aqueous solution discharged from respective storage tanks 180, 181 and 182.

In one embodiment of the present invention, the aqueous metal salt solution injected through the reactant inlet 140 may be an aqueous metal salt solution in which a metal salt containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo) is dissolved at a concentration of 1M to 4M in water, and the metal salt may be a metal salt such as sulfate, nitrate, acetate, chlorate or phosphate containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo).

In one embodiment of the present invention, the basic aqueous solution may be a 1M to 8M sodium hydroxide (NaOH) or potassium hydroxide (KOH) aqueous solution and the aqueous ammonia solution is preferably a 15 to 30% aqueous ammonia solution ($NH_4OH$), but is not limited thereto.

As such, when a metal salt aqueous solution, a basic aqueous solution and an aqueous ammonia solution to prepare the mono-component metal oxide-based or multi-component metal oxide-based cathode active material precursor is injected into the reactant inlet 140 and the inner cylinder 120 is rotated, a vortex 160 is formed in the space between the outer chamber 110 and the inner cylinder 120, reaction occurs, and the vortex 160 moves in the axial direction and reaction occurs, when the reactants are continuously injected (see FIG. 2).

The apparatus 100 for preparing a cathode active material precursor for lithium secondary batteries of the present invention includes a plurality of outlets 151, 152 and 153 provided on the cylindrical outer chamber 110, to obtain final products obtained after reaction in the space between the outer chamber 110 and the inner cylinder 120.

In one embodiment of the present invention, the outlets 151, 152 and 153 are disposed on the outer chamber such that the outlets are disposed in the reactant inlet 140 in parallel in the axial direction and are spaced by a distance of 10 to 20 cm from the reactant inlet 140, but the disposition of the outlets is not limited thereto.

Referring to FIGS. 1 and 3, the apparatus 100 for preparing a cathode active material precursor for lithium secondary batteries according to one embodiment of the present invention includes three outlets 151, 152 and 153. When the cathode active material precursor for lithium secondary batteries is obtained from one selected from among the three outlets 151, 152 and 153, the reaction products can be obtained after the desired average retention time.

In the apparatus 100 for preparing a cathode active material precursor for lithium secondary batteries of the present invention, the number of the outlets 151, 152 and 153 provided on the outer chamber 110 may be changed according to the necessity of those skilled in the art.

In one embodiment of the present invention, the apparatus 100 for preparing a cathode active material precursor for lithium secondary batteries may further include a heat exchanger on the outer chamber to control a reaction temperature in the process of mixing reactants using vortexes in the space between the outer chamber and the inner cylinder.

The heat exchanger may be a heat exchanger commonly known in the art to which the present invention pertains. Also, the present invention also provides a method for preparing a cathode active material precursor for lithium secondary batteries using the apparatus 100 for preparing a cathode active material precursor for lithium secondary batteries.

The method for preparing the cathode active material precursor for lithium secondary batteries according to the present invention includes: adding reactants containing a metal salt aqueous solution, a basic aqueous solution and an aqueous ammonia solution to a reactant inlet 140 (step 1); rotating the inner cylinder 120 to mix the reactants in the space between the outer chamber 110 and the inner cylinder 120 after addition of the reactants in step 1 (step 2); obtaining a reaction product-containing solution of the reactants mixed, while the reactants moving in the axial direction of the outer chamber 110 in step 2 from the outlets 151, 152 and 153 (step 3); and drying the reaction product-containing solution obtained in step 3 and oxidizing the same in the air (step 4).

Step 2 may further include continuously injecting the reactants through the reactant inlet 140 and moving the mixed solution of the reactants in the axial direction of the outer chamber 110 during mixing in the space between the outer chamber 110 and the inner cylinder 120.

Figure 4:
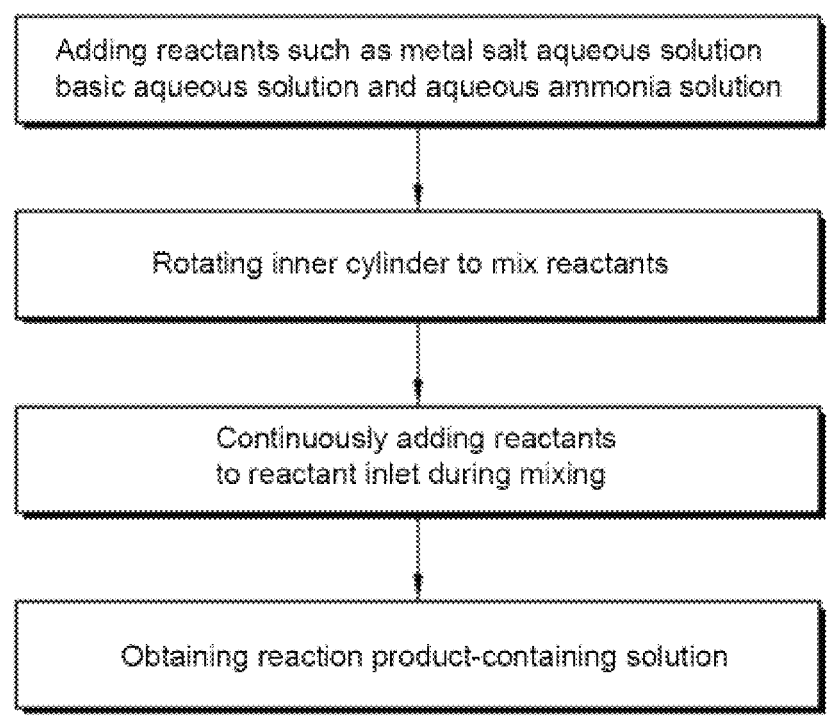
FIG. 4 is a flowchart illustrating a process for preparing the cathode active material precursor for lithium secondary batteries according to the present invention.

FIG. 4 is a flowchart illustrating a process for preparing the cathode active material precursor for lithium secondary batteries according to the present invention.

Hereinafter, the method for preparing the cathode active material precursor for lithium secondary batteries according to the present invention will be described at respective steps in detail with reference to FIGS. 1 to 4.

First, reactants containing a metal salt aqueous solution, a basic aqueous solution and an aqueous ammonia solution are added to the reactant inlet 140. The metal salt aqueous solution may be a metal salt aqueous solution in which a metal salt containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo) is dissolved at a concentration of 1M to 4M in water, and the metal salt may be a metal salt such as a sulfate, nitrate, acetate, chlorate or phosphate containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo).

The basic aqueous solution may be a 1 to 8M sodium hydroxide (NaOH) or potassium hydroxide (KOH) aqueous solution and the aqueous ammonia solution may be a 15 to 30% aqueous ammonia solution ($NH_4OH$).

Then, after addition of the reactants in step 1, the inner cylinder 120 is rotated to mix the reactants in the space between the outer chamber 110 and the inner cylinder 120. As such, the metal salt aqueous solution, the basic aqueous solution and the aqueous ammonia solution are injected through the reactant inlet 140, and the inner cylinder 120 is rotated to mix the reactants in the space between the outer chamber 110 and the inner cylinder 120.

At this time, preferably, the inner cylinder 120 rotates at a speed of 10 to 5,000 rpm and the reactants are mixed at a temperature of 30 to 60 r and at pH of 10 to 12, but is not limited thereto.

As described above, in the apparatus 100 for preparing a cathode active material precursor for lithium secondary batteries of the present invention, when the inner cylinder 120 rotates, a vortex 160 of fluids is formed in the space between the outer chamber 110 and the inner cylinder 120, flow is highly regular and uniform mixing occurs. When the metal salt aqueous solution, the basic aqueous solution and the aqueous ammonia solution are mixed in the space between the outer chamber 110 and the inner cylinder 120, the metal salt aqueous solution reacts with the basic aqueous solution, to obtain a cathode active material precursor with a uniform particle shape, based on mono-component metal oxide or multi-component metal oxide such as $Co(OH)_2$, $Ni(OH)_2$, $Mn(OH)_2$, and $MnNiCo(OH)_2$.

Then, during mixing in the space between the outer chamber 110 and the inner cylinder 120, the reactants are continuously added through the reactant inlet 140. The apparatus 100 for preparing a cathode active material precursor for lithium secondary batteries of the present invention enables continuous injection of the reactants, thereby continuously preparing the mono-component metal oxide-based or multi-component metal oxide-based cathode active material precursor and obtaining final products at a high yield within a short time.

As such, when the reactants are continuously added to the apparatus 100 for preparing a cathode active material precursor for lithium secondary batteries, a mixed solution of the reactants is crystallized through reaction and moves in the axial direction of the outer chamber 110.

Finally, the reaction product-containing solution that is made while the reactants moving in the axial direction of the outer chamber 110 is obtained through the outlets 151, 152 and 153.

The reaction product-containing solution obtained through the outlets 151, 152 and 153 may be obtained in the form of an aqueous solution containing a mono-component metal oxide-based or multi-component metal oxide-based cathode active material precursor that is crystallized by reaction for an average retention time of 0.5 to 2 hours in the apparatus 100 for preparing a cathode active material precursor for lithium secondary batteries of the present invention.

The finally obtained mono-component metal oxide-based or multi-component metal oxide-based cathode active material precursor is obtained through the outlet selected from the plurality of outlets 151, 152 and 153, thereby obtaining a cathode active material precursor crystallized through reaction for the desired average retention time.

Then, the aqueous solution containing the mono-component metal oxide-based or multi-component metal oxide-based cathode active material precursor is dried and oxidized in the air to prepare a mono-component metal oxide-based or multi-component metal oxide-based cathode active material precursor in the form of a powder.

EXAMPLES

Hereinafter, preferred examples of the present invention will be provided. These examples are only provided to illustrate the present invention and those skilled in the art will thus appreciate that various modifications, additions and substitutions are possible, without departing from the scope and spirit of the invention as disclosed in the accompanying claims.

Example 1

A metal salt aqueous solution containing 1M cobalt sulfate ($CoSO_4$), 1M nickel sulfate ($NiSO_4$) and 1M manganese sulfate ($MnSO_4$), 6M sodium hydroxide, 28 to 30% of an aqueous ammonia solution were added at flow rates of 4 ml/min, 4 ml/min and 0.4 ml/min, respectively, to the reactant inlet 140 of the apparatus 100 for preparing a cathode active material precursor for lithium secondary batteries, and the aqueous solutions were reacted and crystallized by rotating an inner cylinder 120 at 45° C. and at pH 10 to prepare $MnNiCo(OH)_2$.

Figure 5:
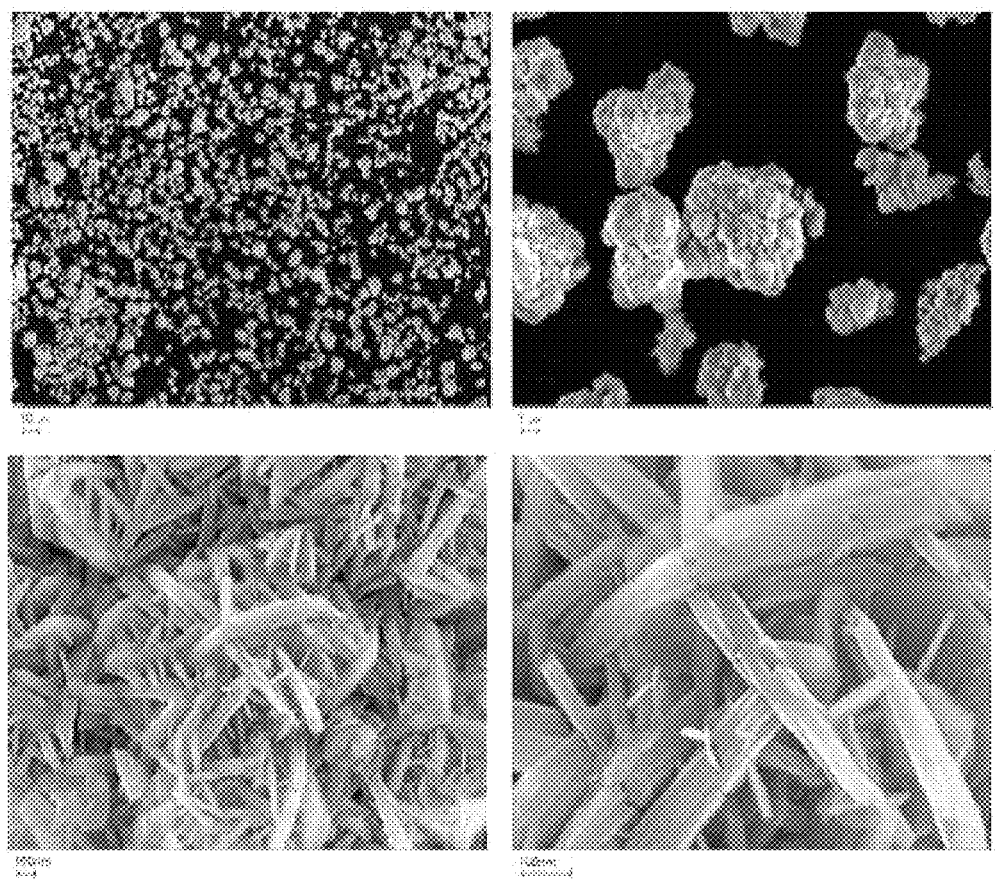
FIGS. 5, 7 and 8 are scanning electron microscopy images obtained at different magnifications of cathode active material precursors (MnNiCo(OH)$_2$) for lithium secondary batteries that are prepared by reacting and crystallizing for average retention times of 10 minutes, 20 minutes and 30 minutes in Example 1 of the present invention.
Figure 6:
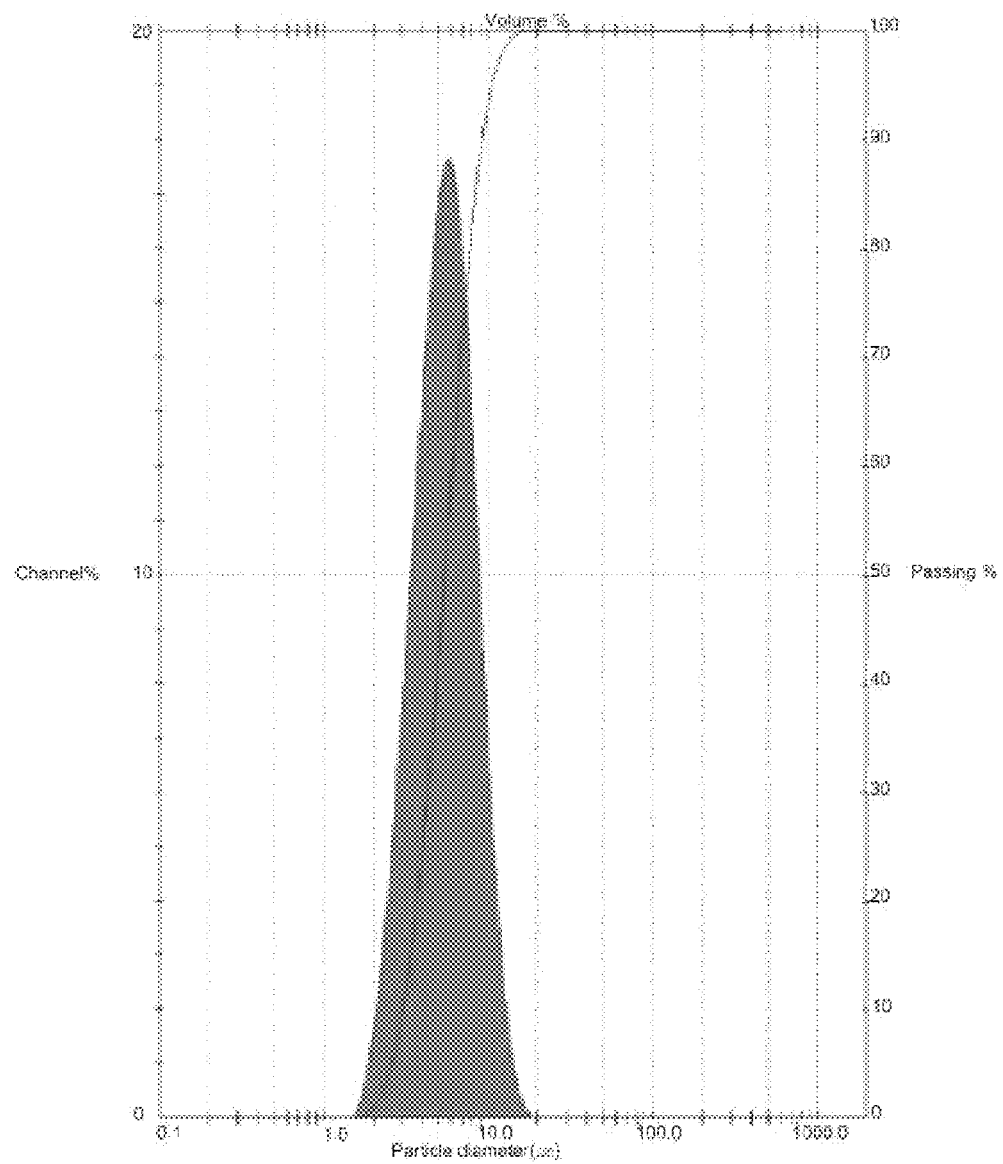
FIG. 6 is a graph showing analysis results of a particle size distribution of cathode active material precursors (MnNiCo(OH)$_2$) for lithium secondary batteries prepared in Example 1 (average retention time of 10 minutes)
Figure 7:
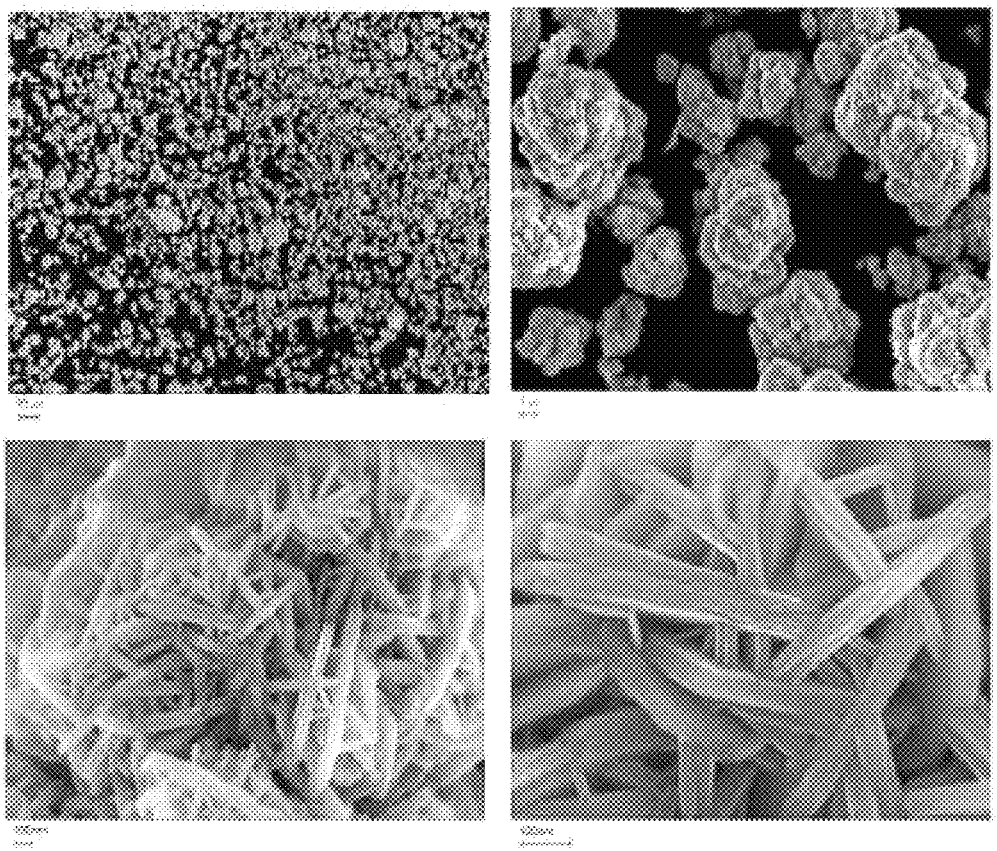
Figure 8:
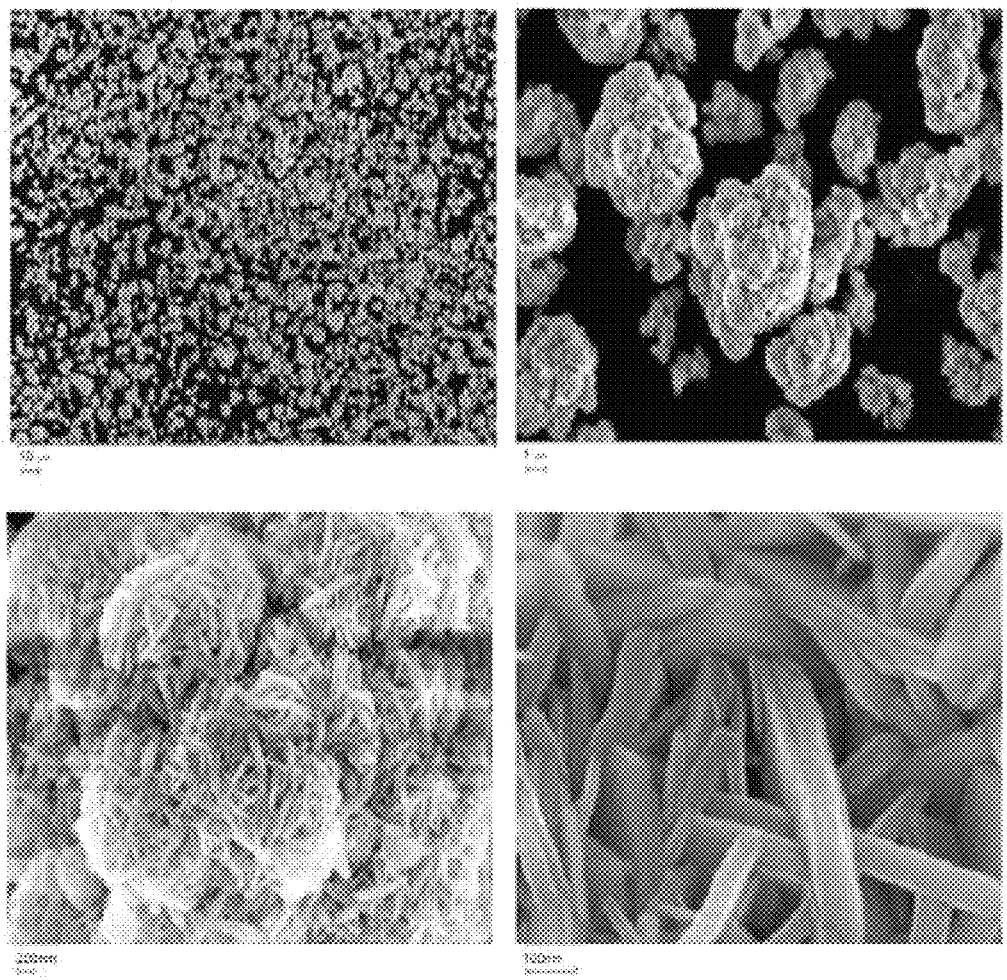

$MnNiCo(OH)_2$ obtained through the outlet 151 of the apparatus 100 for preparing a cathode active material precursor for lithium secondary batteries was reacted and crystallized for an average retention time of 10 minutes. The scanning electron microscopy image of $MnNiCo(OH)_2$ crystals is shown in FIG. 5. $MnNiCo(OH)_2$ obtained through the outlet 152 was reacted for an average retention time of 20 minutes and crystallized. The scanning electron microscopy image of $MnNiCo(OH)_2$ crystals is shown in FIG. 7. $MnNiCo(OH)_2$ obtained through the outlet 153 was reacted for an average retention time of 30 minutes and crystallized. The scanning electron microscopy image of $MnNiCo(OH)_2$ crystals is shown in FIG. 8.

Example 2

$MnNiCo(OH)_2$ was prepared in the same manner as in Example 1, except that the mixing of the metal salt aqueous solution, the basic aqueous solution and the aqueous ammonia solution was carried out at pH 11.

Figure 9:
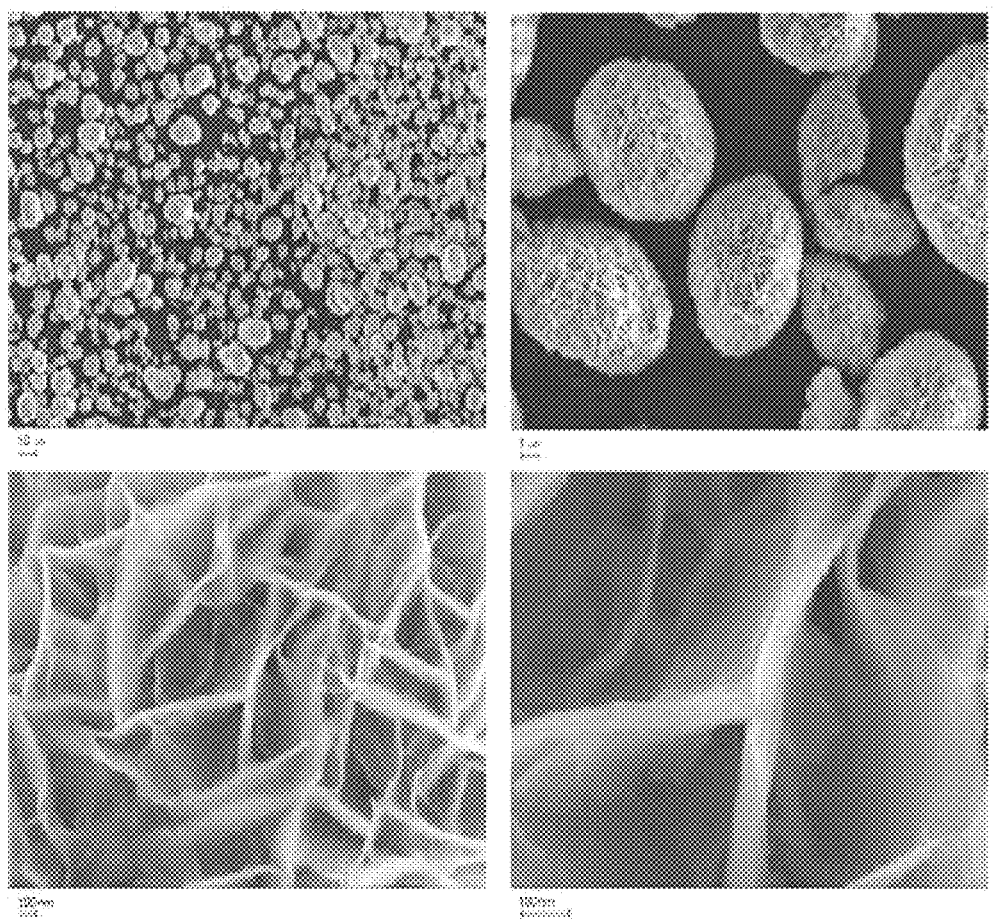
FIGS. 9 to 11 are scanning electron microscopy images obtained at different magnifications of cathode active material precursors (MnNiCo(OH)$_2$) for lithium secondary batteries that are prepared by reacting and crystallizing for average retention times of 10 minutes, 20 minutes and 30 minutes in Example 2 of the present invention.
Figure 10:
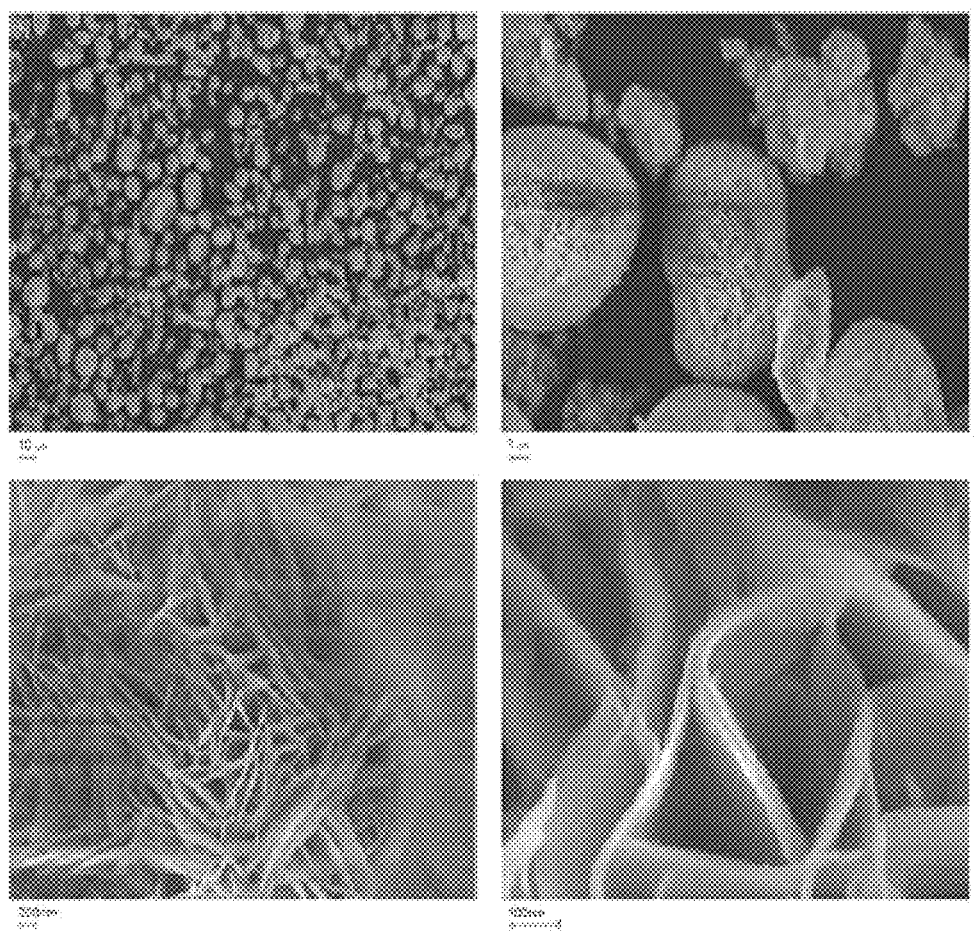
Figure 11:
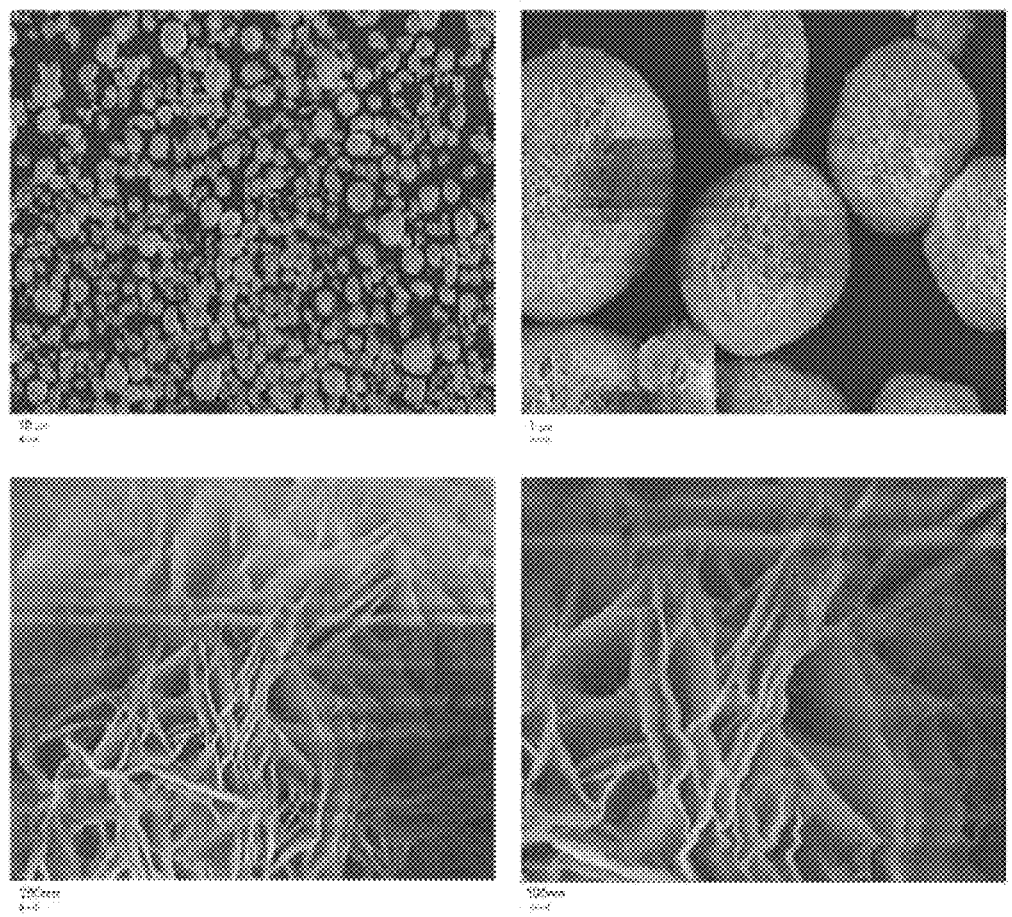

$MnNiCo(OH)_2$ obtained through the outlet 151 of the apparatus 100 for preparing a cathode active material precursor for lithium secondary batteries was reacted for an average retention time of 10 minutes and crystallized. The scanning electron microscopy image of $MnNiCo(OH)_2$ crystals is shown in FIG. 9. $MnNiCo(OH)_2$ obtained through the outlet 152 was reacted for an average retention time of 20 minutes and crystallized. The scanning electron microscopy image of $MnNiCo(OH)_2$ crystals is shown in FIG. 10. $MnNiCo(OH)_2$ obtained through the outlet 153 was reacted for an average retention time of 30 minutes and crystallized. The scanning electron microscopy image of $MnNiCo(OH)_2$ crystals is shown in FIG. 11.

Example 3

Figure 12:
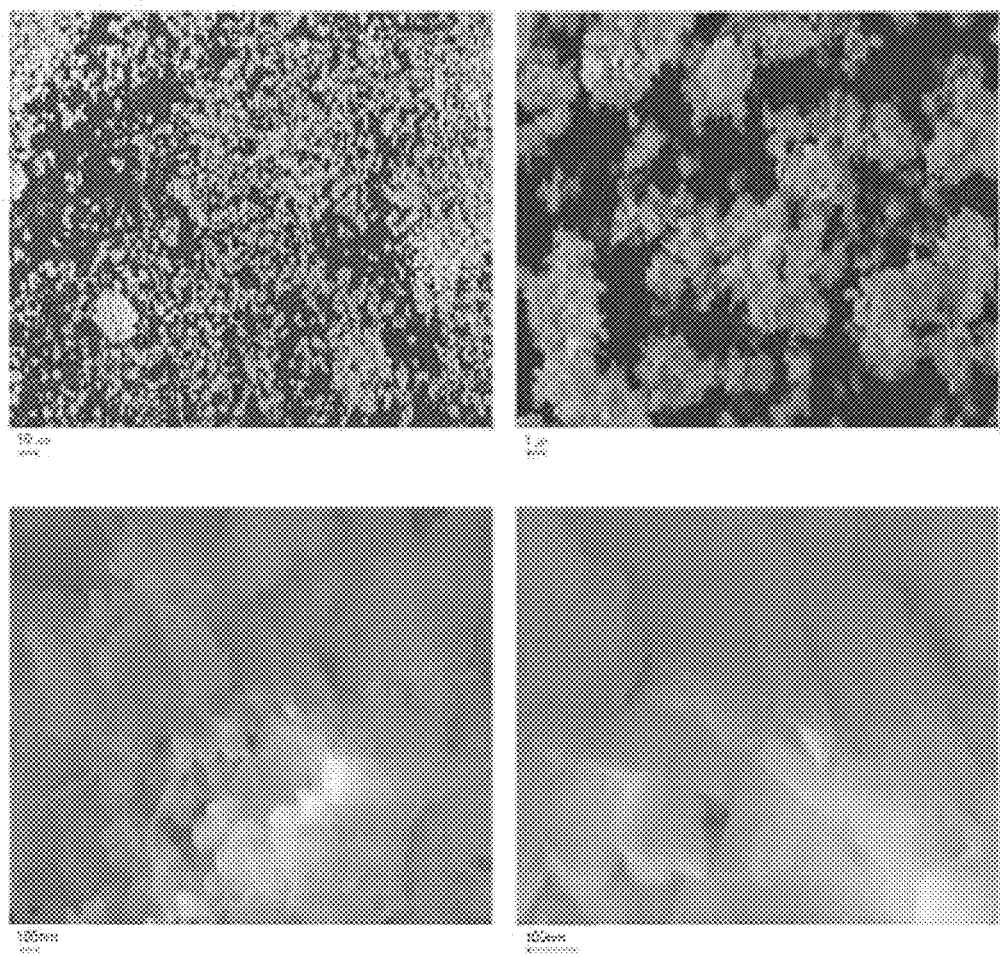
FIG. 12 is a scanning electron microscopy image obtained at different magnifications of a cathode active material precursor (MnNiCo(OH)$_2$) for lithium secondary batteries that is prepared by reacting and crystallizing for an average retention time of 30 minutes in Example 3 of the present invention.

$MnNiCo(OH)_2$ was prepared in the same manner as in Example 1, except that the mixing of the metal salt aqueous solution, the basic aqueous solution and the aqueous ammonia solution was carried out at pH 12. $MnNiCo(OH)_2$ obtained through the outlet 153 of the apparatus 100 for preparing a cathode active material precursor for lithium secondary batteries was reacted for an average retention time of 30 minutes and crystallized. The scanning electron microscopy image of $MnNiCo(OH)_2$ crystals is shown in FIG. 12.

Example 4

$MnNiCo(OH)_2$ was prepared in the same manner as in Example 1, except that, in the process of mixing of the metal salt aqueous solution, the basic aqueous solution and the aqueous ammonia solution, the inner cylinder was rotated at 1,000 rpm.

Figure 13:
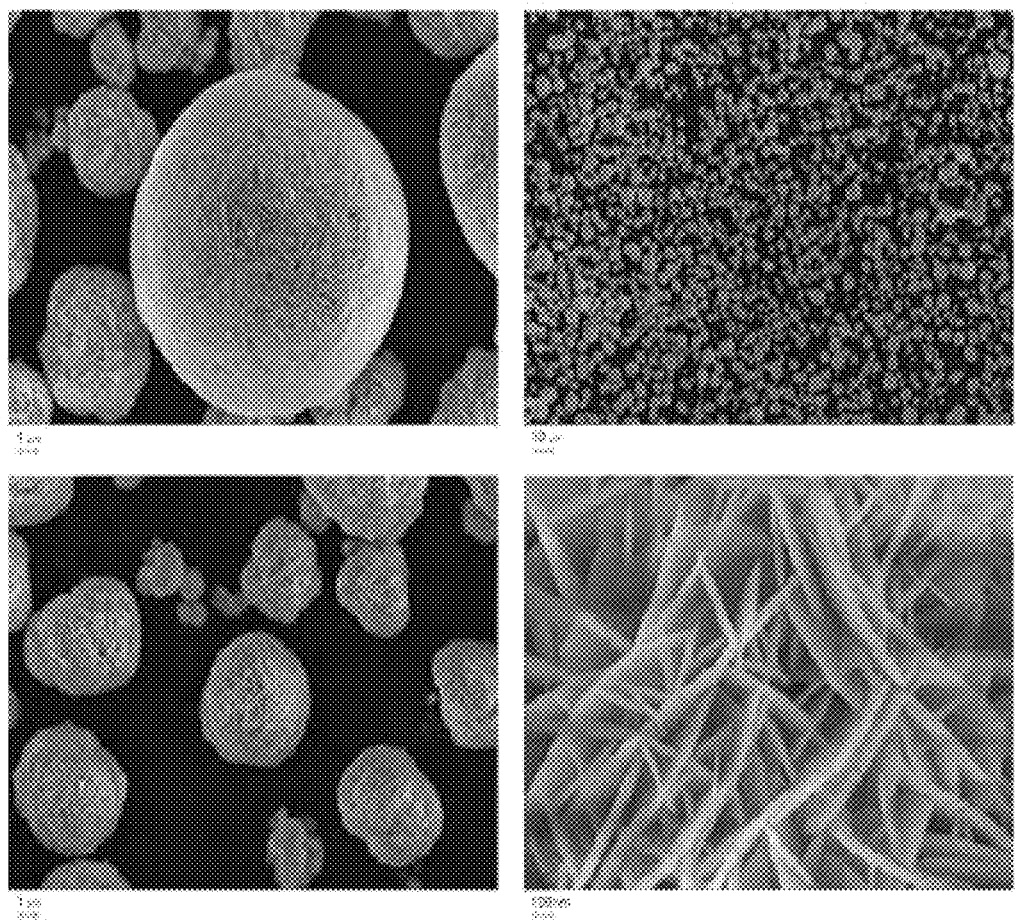
FIGS. 13 to 15 are scanning electron microscopy images obtained at different magnifications of cathode active material precursors (MnNiCo(OH)$_2$) for lithium secondary batteries that are prepared by reacting and crystallizing for average retention times of 10 minutes, 20 minutes and 30 minutes in Example 4 of the present invention.
Figure 14:
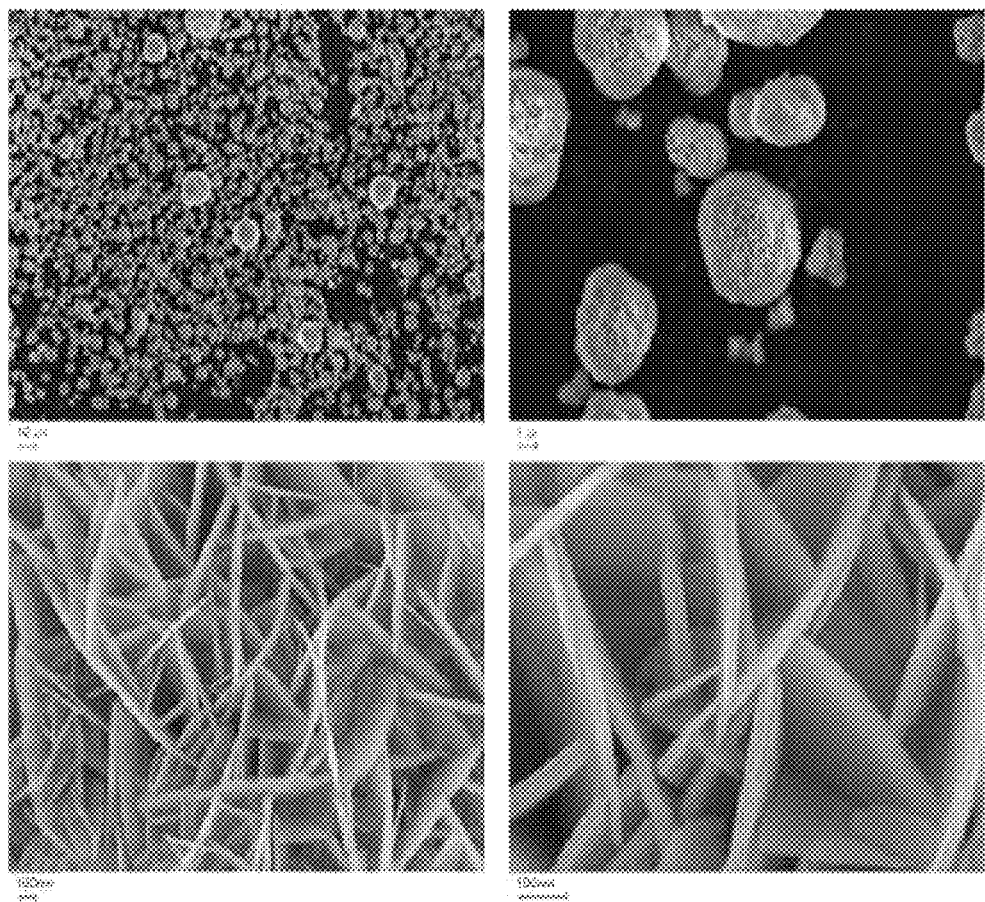
Figure 15:
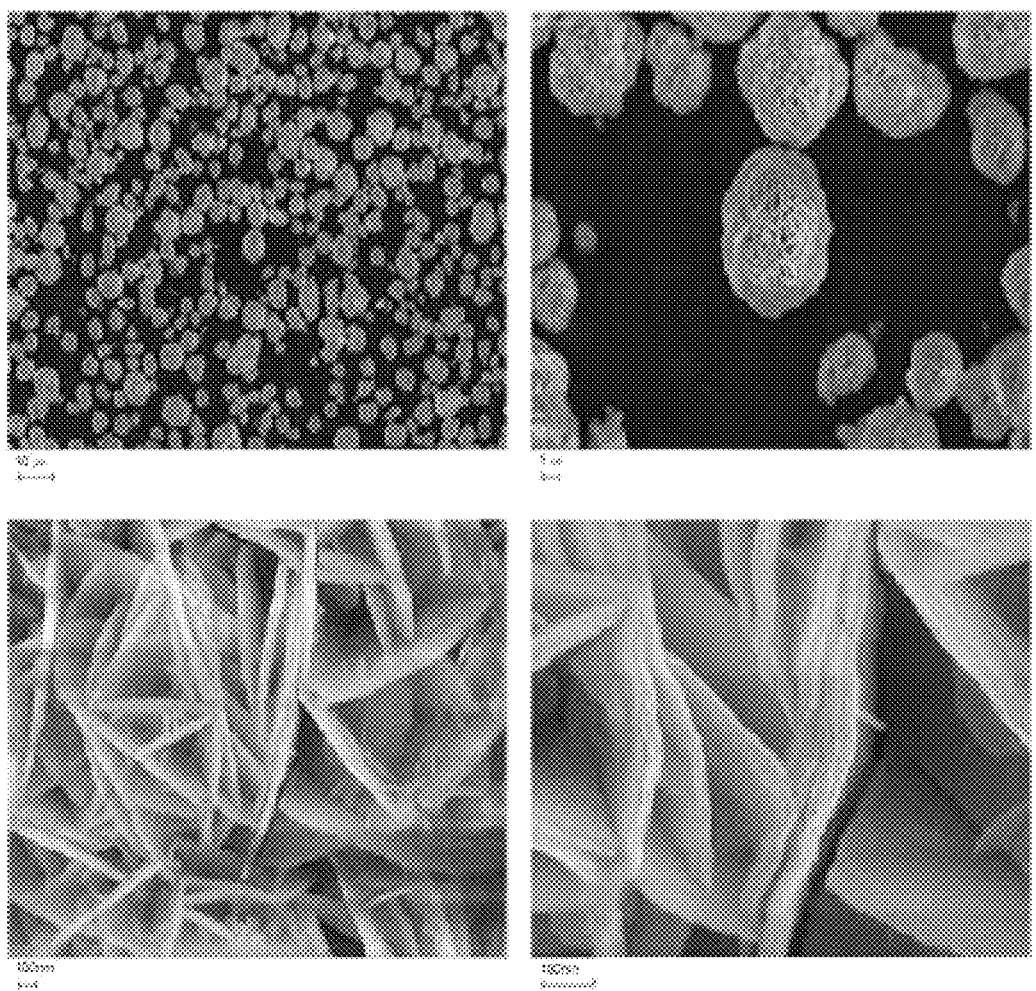

MnNiCo(OH)$_2$ obtained through the outlet 151 of the apparatus 100 for preparing a cathode active material precursor for lithium secondary batteries was reacted for an average retention time of 10 minutes and crystallized. The scanning electron microscopy image of MnNiCo(OH)$_2$ crystals is shown in FIG. 13. MnNiCo(OH)$_2$ obtained through the outlet 152 was reacted for an average retention time of 20 minutes and crystallized. The scanning electron microscopy image of MnNiCo(OH)$_2$ crystals is shown in FIG. 14. MnNiCo(OH)$_2$ obtained through the outlet 153 was reacted for an average retention time of 30 minutes and crystallized. The scanning electron microscopy image of MnNiCo(OH)$_2$ crystals is shown in FIG. 15.

Example 5

MnNiCo(OH)$_2$ was prepared in the same manner as in Example 1, except that, in the process of mixing the metal salt aqueous solution, the basic aqueous solution and the aqueous ammonia solution, the inner cylinder was rotated at 300 rpm.

Figure 16:
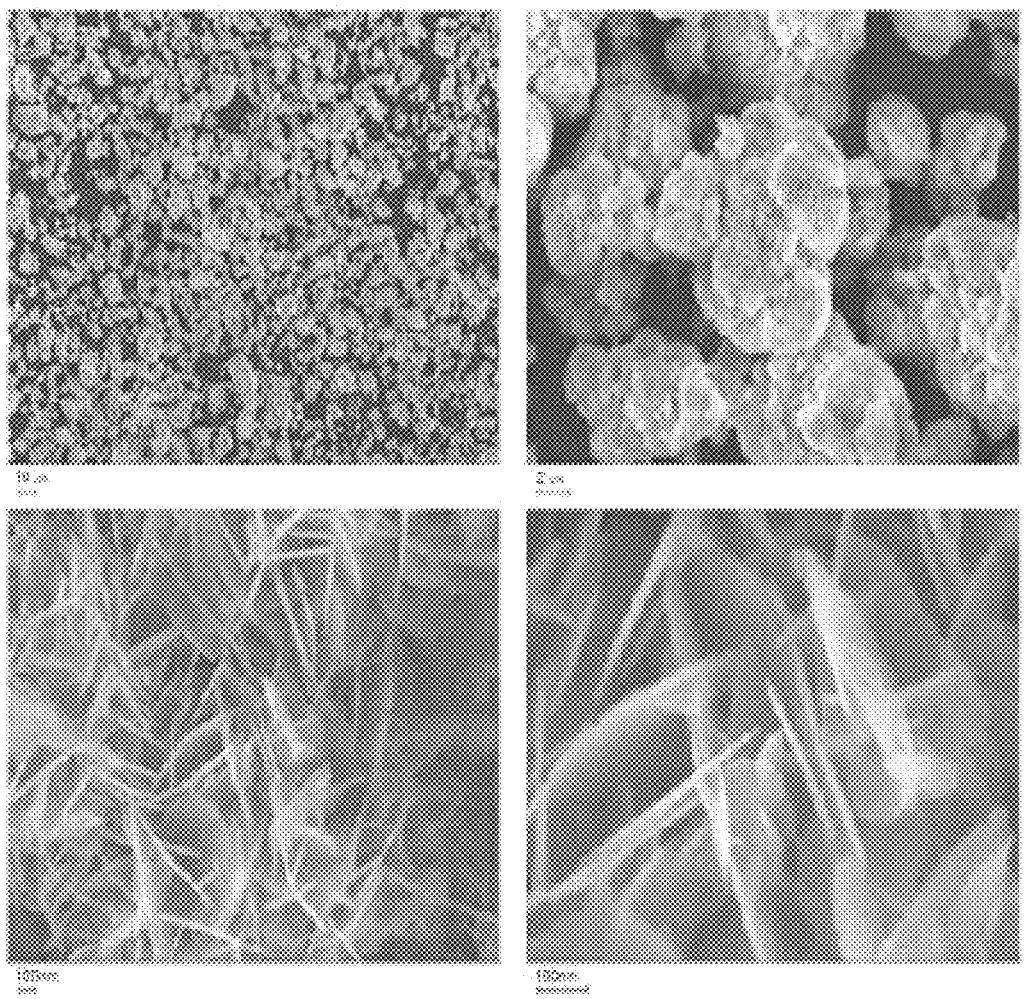
FIGS. 16 to 18 are scanning electron microscopy images obtained at different magnifications of cathode active material precursors (MnNiCo(OH)$_2$) for lithium secondary batteries that are prepared by reacting and crystallizing for average retention times of 10 minutes, 20 minutes and 30 minutes in Example 5 of the present invention.
Figure 17:
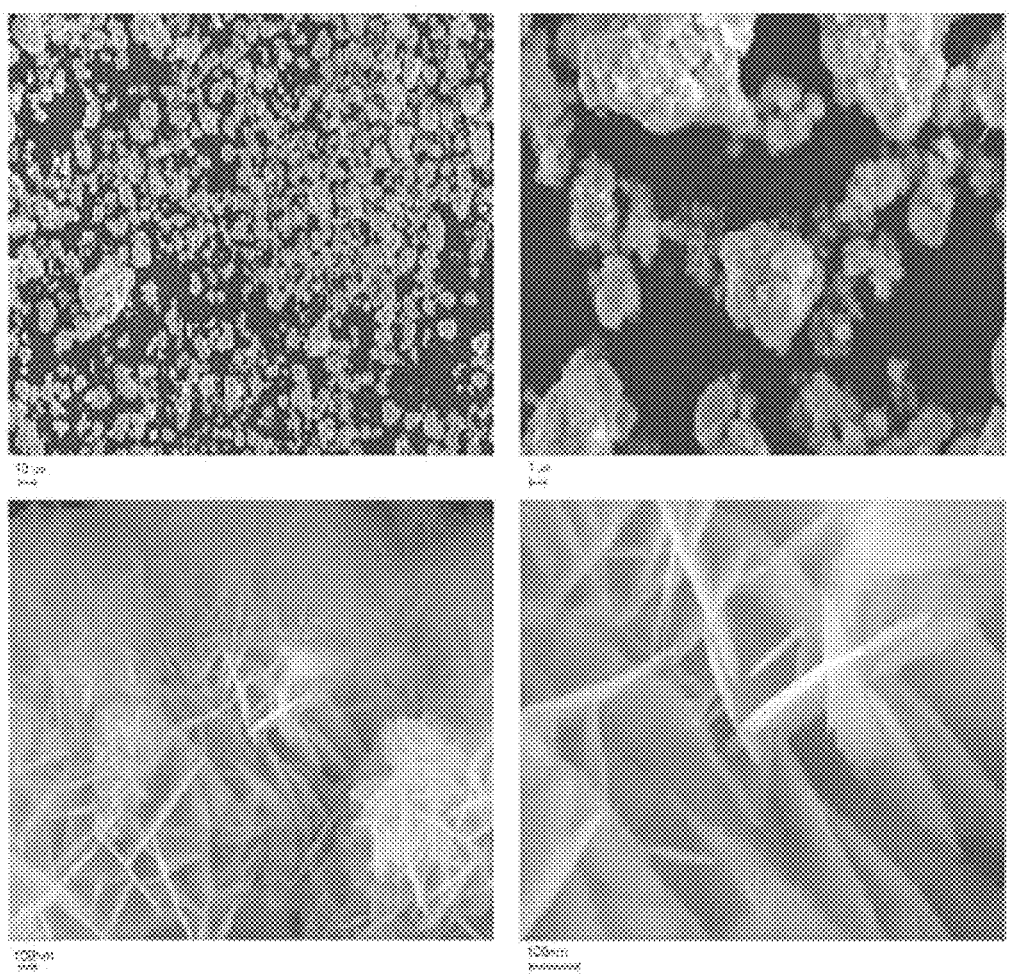
Figure 18:
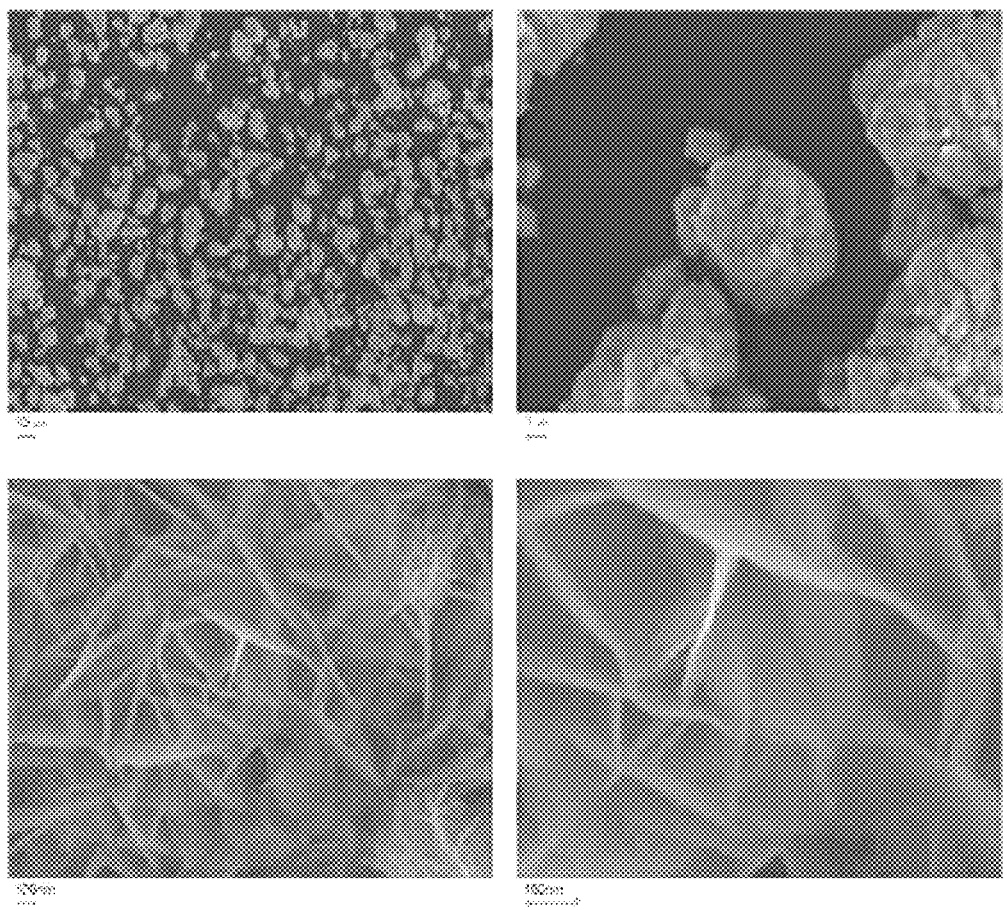

MnNiCo(OH)$_2$ obtained through the outlet 151 of the apparatus 100 for preparing a cathode active material precursor for lithium secondary batteries was reacted for an average retention time of 10 minutes and crystallized. The scanning electron microscopy image of MnNiCo(OH)$_2$ crystals is shown in FIG. 16. MnNiCo(OH)$_2$ obtained through the outlet 152 was reacted for an average retention time of 20 minutes and crystallized. The scanning electron microscopy image of MnNiCo(OH)$_2$ crystals is shown in FIG. 17. MnNiCo(OH)$_2$ obtained through the outlet 153 was reacted for an average retention time of 30 minutes and crystallized. The scanning electron microscopy image of MnNiCo(OH)$_2$ crystals is shown in FIG. 18.

Example 6

MnNiCo(OH)$_2$ was prepared in the same manner as in Example 1, except that, in the process of mixing the metal salt aqueous solution, the basic aqueous solution and the aqueous ammonia solution, the inner cylinder was rotated at 1500 rpm.

Figure 19:
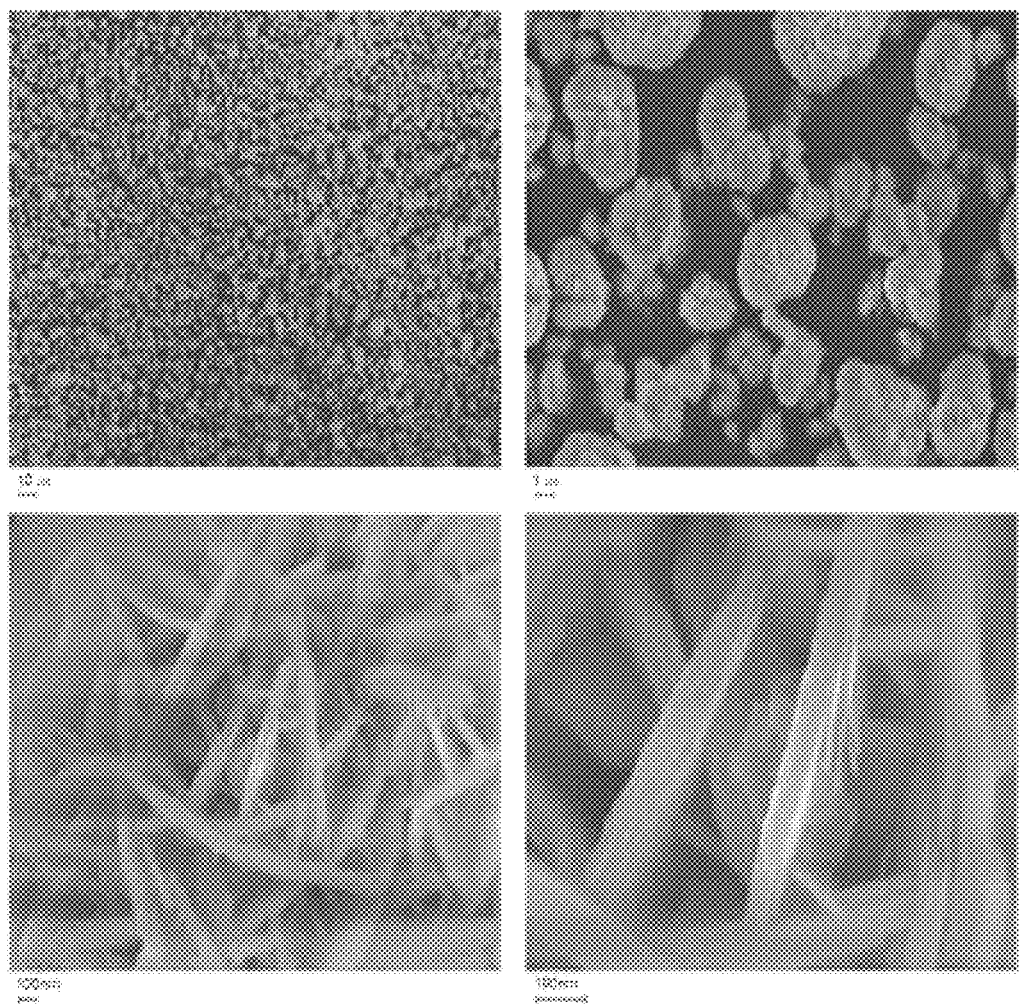
FIGS. 19 to 21 are scanning electron microscopy images obtained at different magnifications of cathode active material precursors (MnNiCo(OH)$_2$) for lithium secondary batteries that are prepared by reacting and crystallizing for average retention times of 10 minutes, 20 minutes and 30 minutes in Example 6 of the present invention.
Figure 20:
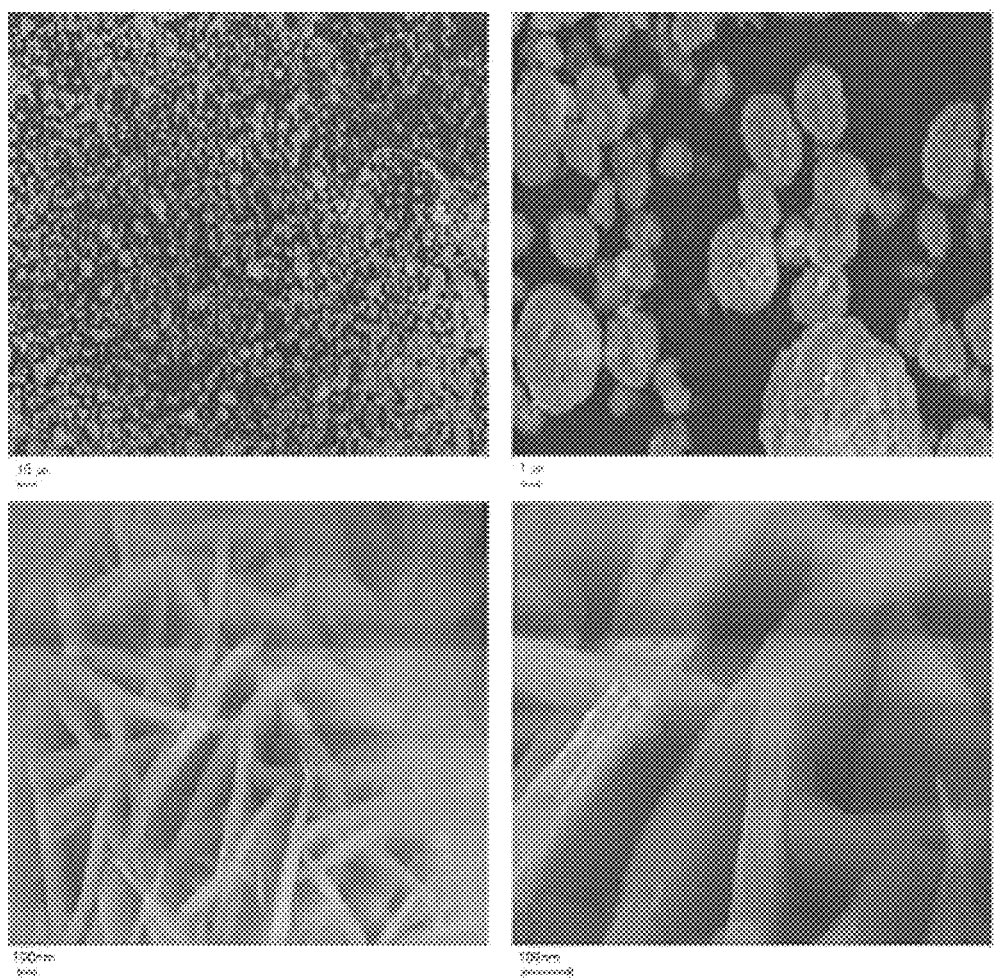
Figure 21:
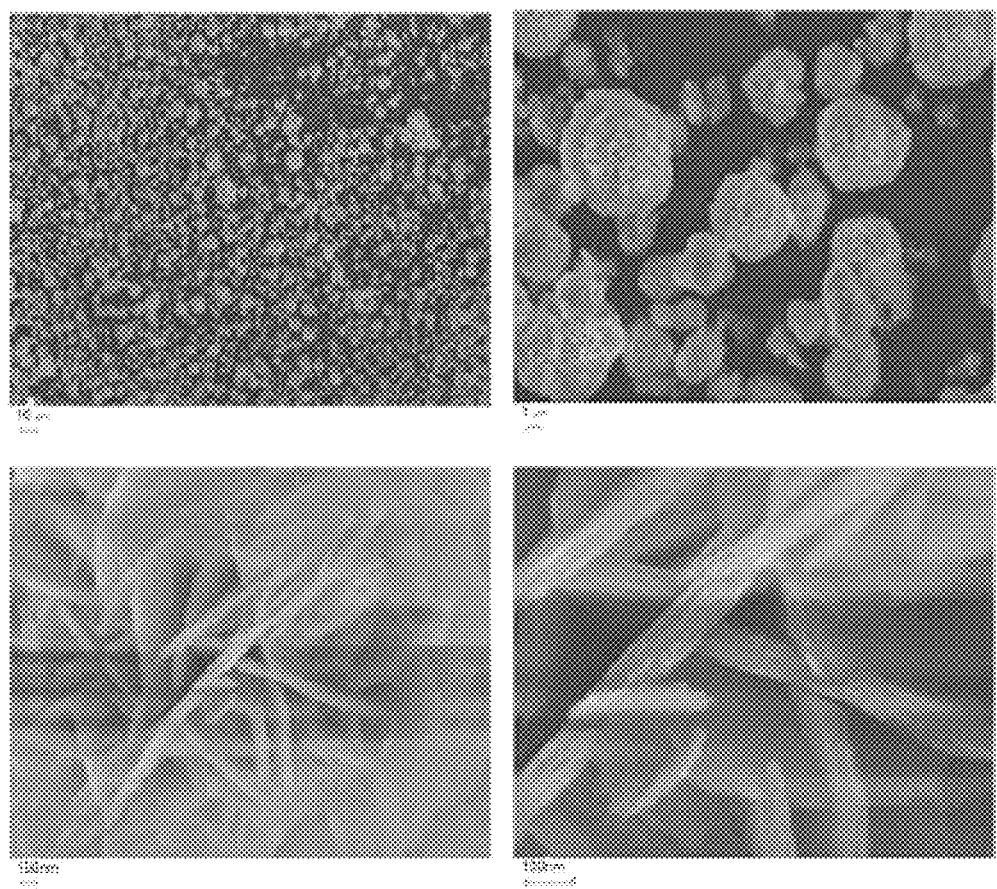

MnNiCo(OH)$_2$ obtained through the outlet 151 of the apparatus 100 for preparing a cathode active material precursor for lithium secondary batteries was reacted for an average retention time of 10 minutes and crystallized. The scanning electron microscopy image of MnNiCo(OH)$_2$ crystals is shown in FIG. 19. MnNiCo(OH)$_2$ obtained through the outlet 152 was reacted for an average retention time of 20 minutes and crystallized. The scanning electron microscopy image of MnNiCo(OH)$_2$ crystals is shown in FIG. 20. MnNiCo(OH)$_2$ obtained through the outlet 153 was reacted for an average retention time of 30 minutes and crystallized. The scanning electron microscopy image of MnNiCo(OH)$_2$ crystals is shown in FIG. 21.

The scanning electron microscopy images and particle size analysis results of MnNiCo(OH)$_2$ prepared in Examples 1 to 6 were observed. It can be seen from the result that, when MnNiCo(OH)$_2$ was prepared using the apparatus for preparing a cathode active material precursor for lithium secondary batteries of the present invention, MnNiCo(OH)$_2$ was obtained in the form of particles having an even particle size distribution.

As apparent from the fore-going, the present invention provides an apparatus and a method for preparing a cathode active material precursor for lithium secondary batteries, in which reaction time is shortened and aggregation of crystal particles is facilitated in the preparation of a cathode active material precursor for lithium secondary batteries, to obtain particles with a uniform size and thereby enable mass-production and impart superior properties to the cathode active material precursor for lithium secondary batteries.

The cathode active material precursor for lithium secondary batteries prepared according to the present invention has a uniform particle shape and improves density through suitable mixing, thus obtaining a higher capacity in the same volume of batteries.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparing a cathode active material precursor for lithium secondary batteries using an apparatus having a cylindrical outer chamber having a cylindrical sidewall; an inner cylinder that has the same central axis as the outer chamber and is mounted to rotatably move along the central axis; an electric motor to transfer power to rotate the inner cylinder; a reactant inlet disposed on the outer chamber, to add reactants to a space between the outer chamber and the inner cylinder; and an outlet disposed in the outer chamber, to obtain reaction products after reaction in the space between the outer chamber and the inner cylinder, comprising:
    adding reactants containing a metal salt aqueous solution, a basic aqueous solution and an aqueous ammonia solution to a reactant inlet (step 1);
    rotating the inner cylinder to form ring-shaped vortex pairs that rotate in opposite directions along the central axial direction and to mix the reactants in the space between the outer chamber and the inner cylinder after addition of the reactants in step 1 (step 2);
    obtaining a reaction product-containing solution of the reactants mixed, while the reactants moving in the axial direction of the outer chamber in step 2, from the outlet (step 3);
    removing the reaction product-containing solution through the cylindrical sidewall of the outer chamber; and
    drying the reaction product-containing solution obtained in step 3 and oxidizing the same in the air (step 4).

2. The method according to claim 1, wherein step 2 further comprises continuously adding the reactants to the reactant inlet during mixing in the space between the outer chamber and the inner cylinder.

3. The method according to claim 1, wherein, in step 2, the inner cylinder was rotated at a speed of 10 to 5,000 rpm and the reactants are mixed at a temperature of 30 to 60° C. and at a pH 10 to 12.

4. The method according to claim 1, wherein, in step 1, the metal salt aqueous solution is a metal salt aqueous solution in which a metal salt containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo) is dissolved at a concentration of 1M to 4M in water, and the metal salt is a sulfate, nitrate, acetate, chlorate or phosphate containing at least one metal selected from the group consisting of cobalt (Co), manganese (Mn), nickel (Ni), aluminum (Al), magnesium (Mg), copper (Cu), zinc (Zn), iron (Fe), vanadium (V), chromium (Cr), titanium (Ti), tungsten (W) and molybdenum (Mo).

5. The method according to claim 1, wherein the basic aqueous solution is a 1M to 8M sodium hydroxide aqueous solution or potassium hydroxide aqueous solution.

6. The method according to claim 1, wherein the aqueous ammonia solution is a 15 to 30% aqueous ammonia solution and is added at an amount of 1 to 20% by volume, with respect to the total weight of the mixed solution of the reactants.

7. The method according to claim 1, wherein the reaction product-containing solution is removed through one of a plurality of openings spaced along an axial direction of the cylindrical sidewall of the outer chamber.

* * * * *